United States Patent
Modera et al.

(10) Patent No.: US 7,174,791 B2
(45) Date of Patent: *Feb. 13, 2007

(54) METHOD AND DEVICE FOR MEASURING AIRFLOWS THROUGH HVAC GRILLES

(75) Inventors: Mark Peter Modera, Piedmont, CA (US); Robert Hageman, Austin, TX (US); Brian Farmer, Indianapolis, IN (US)

(73) Assignee: Carrier Corporation, Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/176,167

(22) Filed: Jul. 7, 2005

(65) Prior Publication Data

US 2005/0241293 A1 Nov. 3, 2005

Related U.S. Application Data

(63) Continuation of application No. 10/338,447, filed on Jan. 8, 2003, now Pat. No. 6,923,072.

(60) Provisional application No. 60/358,641, filed on Feb. 21, 2002.

(51) Int. Cl.
*G01F 1/00* (2006.01)

(52) U.S. Cl. ...................................................... 73/861

(58) Field of Classification Search ............... 73/202.5, 73/861.52, 861.28, 861.02, 861; 236/49.3; 123/494

See application file for complete search history.

(56) References Cited

U.S. PATENT DOCUMENTS

| | | | |
|---|---|---|---|
| 4,523,478 A | 6/1985 | Zacharias, Jr. | |
| 4,877,183 A | 10/1989 | Matsuda et al. | |
| 5,295,397 A | 3/1994 | Hall et al. | |
| 5,533,668 A | 7/1996 | Erikson | |
| 5,564,626 A | 10/1996 | Kettler et al. | |
| 5,606,111 A | 2/1997 | Pilie et al. | |
| 5,641,340 A | 6/1997 | Kagan | |
| 6,079,627 A | 6/2000 | Kettler | |
| 6,186,179 B1 | 2/2001 | Hill | |
| 6,415,617 B1 | 7/2002 | Seem | |
| 6,431,127 B2 | 8/2002 | Weber | |
| 6,439,468 B1 | 8/2002 | Lambert et al. | |
| 6,460,356 B1 | 10/2002 | Tao et al. | |
| 6,514,721 B2 | 2/2003 | Spurrell | |
| 6,516,785 B1 | 2/2003 | Nakada et al. | |
| 6,643,128 B2 | 11/2003 | Chu et al. | |
| 6,655,207 B1 | 12/2003 | Speldrich et al. | |
| 6,772,714 B2 | 8/2004 | Laird et al. | |
| 6,923,072 B2 * | 8/2005 | Modera et al. | ............... 73/861 |

* cited by examiner

*Primary Examiner*—Jewel Thompson
(74) *Attorney, Agent, or Firm*—Carlson, Gaskey & Olds

(57) ABSTRACT

A fan powered by a controlled external energy source and a flow measurement device measure the airflow exiting or entering grilles/registers of an HVAC system without impeding the airflow being measured. A flow straightening element is preferably employed to overcome any effects of a non-uniform or swirled airflow profile on the fan. Preferably, the RPM of the fan is measured to determine the airflow. The RPM/flow calibration of the fan is insensitive to pressure differentials or the fan is a pressure-sensitive fan submitted to appropriate pressure differentials. Alternatively, the voltage or current supplied to the external energy source is used to determine the airflow. Finally, the pressure differential across the flow straightening element can be measured to determine airflow, eliminating the impact of pressure differential across the flow measurement device and fan.

20 Claims, 3 Drawing Sheets

METHOD AND DEVICE FOR MEASURING AIRFLOWS THROUGH HVAC GRILLES

This application is a continuation of U.S. patent application 10/338,447 filed on Jan. 8, 2003 now U.S. Pat. No. 6,923,072 which claims priority from provisional application Ser. No. 60/358,641 filed Feb. 21, 2002.

BACKGROUND OF THE INVENTION

The present invention relates generally to a method and device for measuring the airflow exiting the duct system of an HVAC system with a fan powered by a controlled external energy source and a flow measurement device.

Airflow through an HVAC system flows into the system through return grilles or outdoor air intakes, is pushed or pulled by the fan, and then is forced through a duct system, exiting through a supply register or grille into a room to provide cooling, heating or ventilation. It is often desirable to measure the airflow out of or into the duct system to determine if the desired flow is being provided to or removed from each room or zone.

Airflows entering or exiting grilles are commonly measured using either a pressure-measurement grid that attempts to determine average velocity or a flow measurement device including an impeller in which the speed of the impeller is an indication of the speed of the airflow.

There are several drawbacks to both of these techniques. Pressure measurement grids suffer from inaccuracies that are caused by spatially non-uniform velocities. Empirical register dependent correction factors have been employed to account for non-uniform velocity biases with pressure measurement grids, however, the use of these correction factors is cumbersome and unreliable in the field applications. Flow straightening elements for pressure-measurement grids have also been employed to eliminate the need for correction factors and improve accuracy, but create excessive flow resistance.

The process of measuring the airflow with the impeller-based flow measurement device also creates flow resistance, impeding the airflow being measured. With conventional flow measurement devices, the impeller is spun by energy in the airflow that is being measured, which means that the impellear changes the flow being measured. Another problem sometimes associated with the prior art impeller-based flow measurement devices is that the measurement of the airflow is biased if the airflow exiting the duct system has a swirled profile. Flows have also been measured in research settings using a flow capture hood and a remote calibrated fan.

Hence, it would be beneficial to employ a flow measurement device that does not impede the airflow being measured and that accommodates for non-uniform or swirled airflow profiles.

SUMMARY OF THE INVENTION

A fan powered by an external energy source and a flow measurement device measure the airflow exiting a supply register or grille of an HVAC system without impeding the airflow being measured. As the fan is powered by an external energy source rather than being powered by energy in the airflow, there is less flow resistance and impedance to the airflow. Preferably, the fan is insensitive to pressure differentials, or a pressure-sensitive fan is submitted to appropriate pressure differentials.

Because the fan is powered by an external energy source, a flow-straightening element can be employed to overcome any effects of a non-uniform or swirled airflow profile on the fan.

Preferably, a tachometer is employed to measure the RPM of the fan. As airflow is a function of the RPM of the fan, the RPM of the fan is an indication of the airflow through the supply register or grille. For fans whose RPM/flow calibrations are sensitive to pressure differentials, the flow-straightening element is designed to keep the pressure differential across the fan within pressure differential calibration limits over the full range of flows measured, so that flow measurement is not impacted by a pressure drop or rise across the fan. This is especially important at low RPMs. The pressure drop across the fan should be very low, such as between 0–3 Pa.

Alternatively, a voltage or current meter is employed to measure the voltage or current supplied to the external energy source that drives the fan, and thereby determine the airflow. As the voltage or current increases, the airflow through the supply register or grille increases.

Finally, a pressure sensor can employed to measure the pressure differential across the flow-straightening element and therefore determine the airflow. Pressure sensors are positioned in the hood and between the straightening element and the fan, respectively, to determine the pressure differential and therefore the airflow.

Independent of the chosen technique for sensing the flowrate, a control circuit can be employed to automatically adjust the voltage or current supplied to the external energy source to maintain the desired zero pressure differential between the pressure in the hood and pressure in the room.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
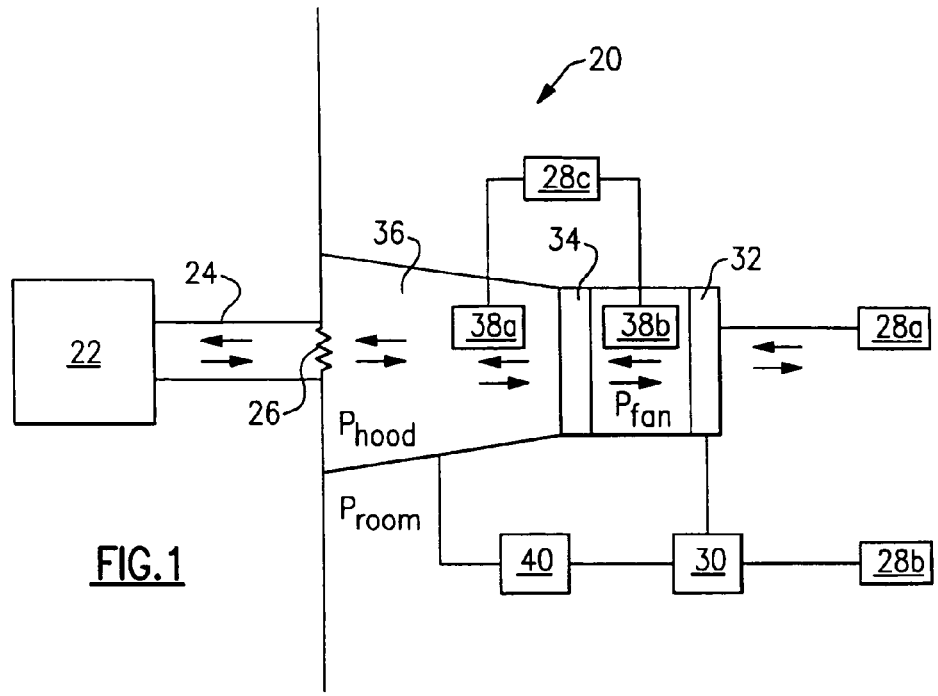
FIG. 1 illustrates a schematic diagram of a top view of the flow measurement system of the present invention.

FIG. 1 schematically illustrates the flow measurement system 20 of the present invention. Heated or cooled air from a furnace or air conditioner 22 flows through the duct system 24 and exits through a supply register or grille 26 into a room for heating or cooling. A fan 32 powered by an external energy source 30 and a flow measurement device 28a, 28b or 28c measures the airflow exiting the duct system 24. As the fan 32 is powered by an external energy source 30 rather than being powered by energy in the airflow, there is less flow resistance and impedance to the airflow being measured. Preferably, the RPM/flow calibration of the fan 32 is insensitive to pressure differentials or the fan is a pressure-sensitive fan, such as a muffin fan, submitted to appropriate pressure differentials.

Figure 2:
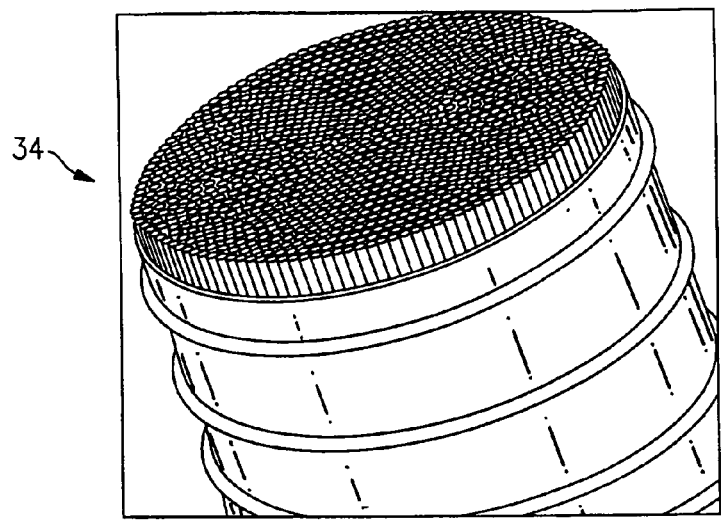
FIG. 2 illustrates an example flow straightening device.

The fan 32 is positioned in front of the supply register or grille 26 and under a capture hood 36. Because the fan 32 is powered by an external energy source 30, a flow-straightening element 34 is preferably employed to overcome any effects of a non-uniform or swirled airflow profile on the fan 32. Preferably, the RPM/flow calibration of the fan 32 is insensitive to swirl and the flow straightening element 34 is not required. If a flow straightening element 34 is employed, the airflow first passes through the flow-straightening element 34 and is straightened prior to approaching the fan 32. The flow-straightening element 34 is a honeycomb, a plurality of straws, or a perforated plate. FIG. 2 illustrates the flow-straightening element 34 including a plurality of straws.

Figure 3:
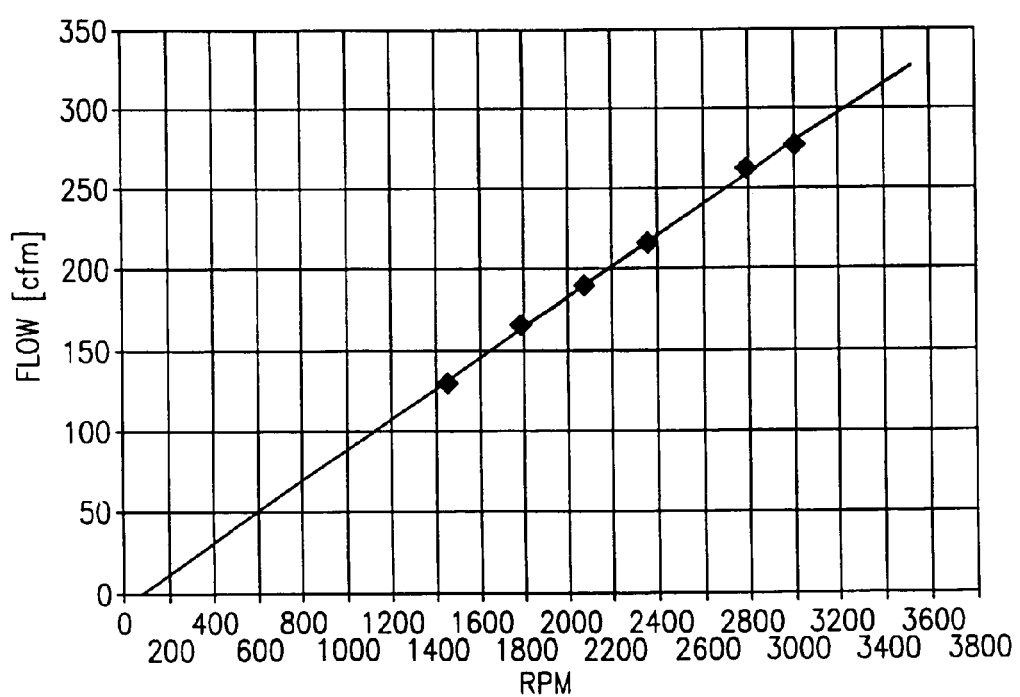
FIG. 3 illustrates a graph relating the RPM of the fan to airflow at zero pressure differential across the fan.

Several characteristics of the flow measurement system 20 can be used to measure the flow entering or exiting the supply register or grille 26, including flow measurement devices 28a, 28b or 28c. Preferably, a tachometer 28a is employed to measure the RPM of the fan 32. As shown in FIG. 3, there is a linear relationship between the RPM of the fan 32 and the airflow as long as the pressure drop across the fan 32 is kept below 0–3 Pa. Preferably, the pressure drop across the fan 32 is maintained to prevent a change in the RPM/flow calibration of the fan by more than 5%. The RPM of the fan 32 is used to determine the airflow through the supply register or grille 26 as the airflow is a function of the RPM of the fan 32.

When using the preferred RPM method for measuring airflow for fans 32 whose RPM/flow calibrations are sensitive to pressure differentials, such as muffin fans, the flow-straightening element 34 must be designed to keep the pressure differential across the fan 32 within pressure differential calibration limits over the full range of flows measured, so that the flow measurement is not impacted by a pressure drop or rise across the fan 32. This is especially important at low RPMs.

The pressure drop across the pressure-sensitive fan 32 should be very low, such as between 0–3 Pa. Higher pressure drops across the fan 32 would influence the RPM-flow calibration of the fan 32, and therefore complicate the measurement of the airflow, requiring both RPM and pressure sensing for the calibration. For some pressure sensitive fans 32, the RPM-flow calibration only works when the pressure drop or rise across the fan 32 is kept below 1 Pa at lower flows and below 2–3 Pa at higher flows. The flow range over which a pressure sensitive fans 32 are extra sensitive to the pressure differential across the fans is determined by the open area of the fans 32. The impact of pressure differential can also be mitigated through fan 32 design. Fans 32 that are insensitive to pressure differentials are not impacted by the pressure drop or rise across the fan 32.

An adequately small pressure differential across the fan 32 can also be maintained by choosing an appropriate diameter for the fan 32 relative to the flow resistance of the flow straightening element 34. A worker skilled in the art would determine the appropriate diameter for the fan 32 for use in the system 20 to control the pressure differential by reducing the diameter of the fan 32 until the RPM of the fan 32 is high enough that the calibration is not impacted over the full range of flow straightening element 34 pressure drop combinations.

Figure 4:
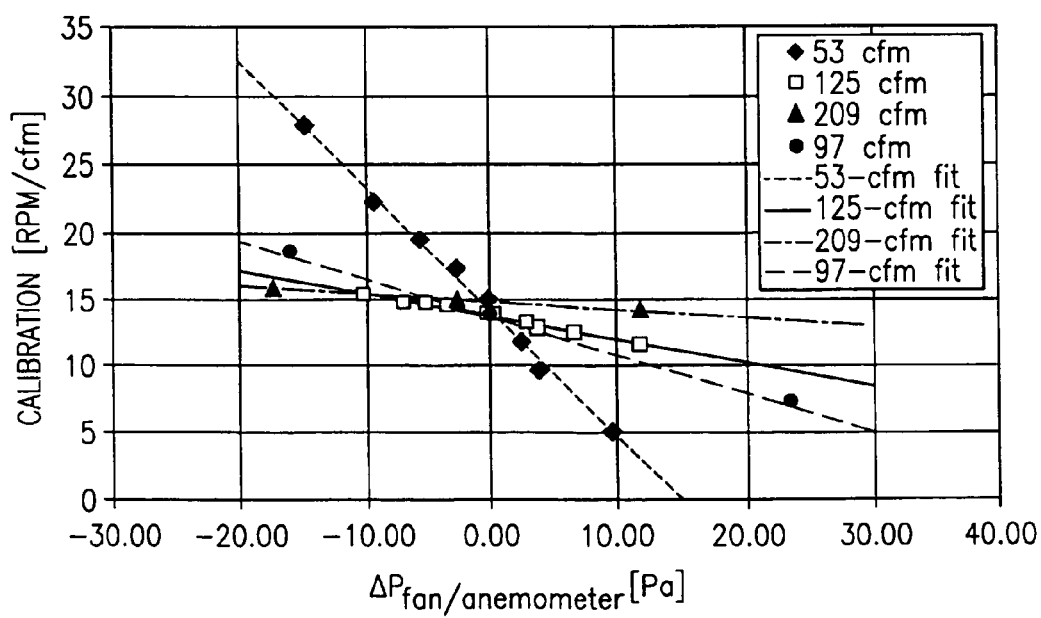
FIG. 4 illustrates a graph relating fan RPM calibration sensitivity to pressure differential at different airflow rates.

FIG. 4 illustrates the relationship between fan 32 sensitivity to pressure differential at different air flow rates and the importance of keeping the pressure differential across pressure-sensitive fans 32 within small pressure differential calibration limits. As shown, at low flow rates, such as 53 cubic feet per minute, the calibration of the fan 32 decreases as the pressure change increases. At high flow rates, such as 209 cubic feet per minute, the calibration of the fan 32 stays relatively constant as the pressure change increases. At all flow rates, the calibration of the fan 32 is constant at about 14 RPM/cfm when the pressure change is zero. Therefore, it is important to maintain the pressure differential across the fan 32 close to zero to maintain a constant RPM calibration of the fan 32.

Figure 5:
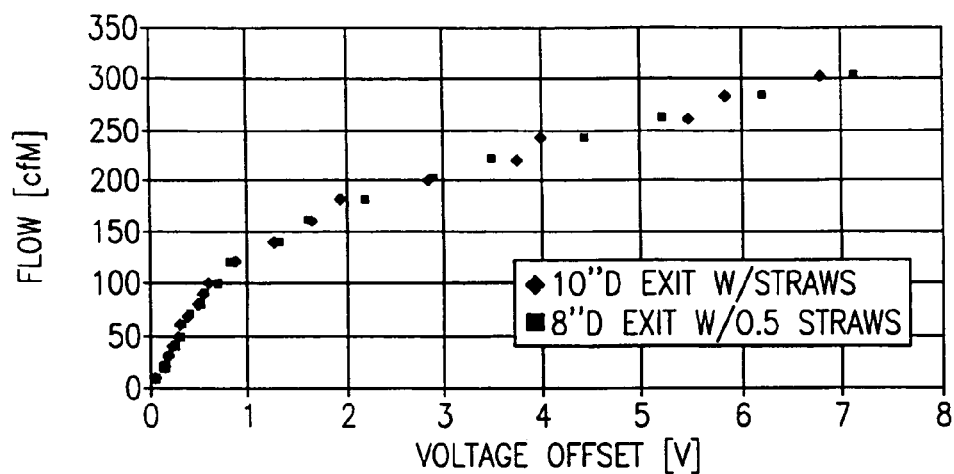
FIG. 5 illustrates a graph relating airflow to changes in the DC voltage supplied to the external energy source.

Alternatively, as shown in FIG. 5, a volt or current meter 28b is employed to measure the voltage or current supplied to the external energy source 30 which drives the fan 32 and used to determine the airflow. As the voltage or current increases, the airflow through the supply register or grille 26 increases. The plot of FIG. 5 was generated employing a 10 inch diameter supply register or grille 26 and employing a flow-straightening element 34 of straws and a 8 inch diameter supply register 26 employing a flow-straightening element 34 having only half the number of straws.

Finally, a pressure sensor 28c can be employed to measure the pressure differential across the flow-straightening element 34 (pressure difference between the capture hood 36 and the region between the fan 32 and the flow straightening element 34) and therefore determine the airflow. Pressure sensors 38a and 38b positioned before and after the flow-straightening element 34 determine the pressure differential across the flow-straightening element 34 and therefore the airflow. The relationship between the pressure differential and the air flow is determined by the type of flow-straightening element 34 employed. In one example, the flow-straightening element 34 is a plurality of straws, and the air flow has a linear relationship with the pressure differential. If the flow-straightening element 34 is a perforated plate, the air flow is related to the square root of the pressure differential. However, it is to be understood that other types of flow straightening elements 34 can be employed to determine the pressure differential and therefore the air flow.

Figure 6:
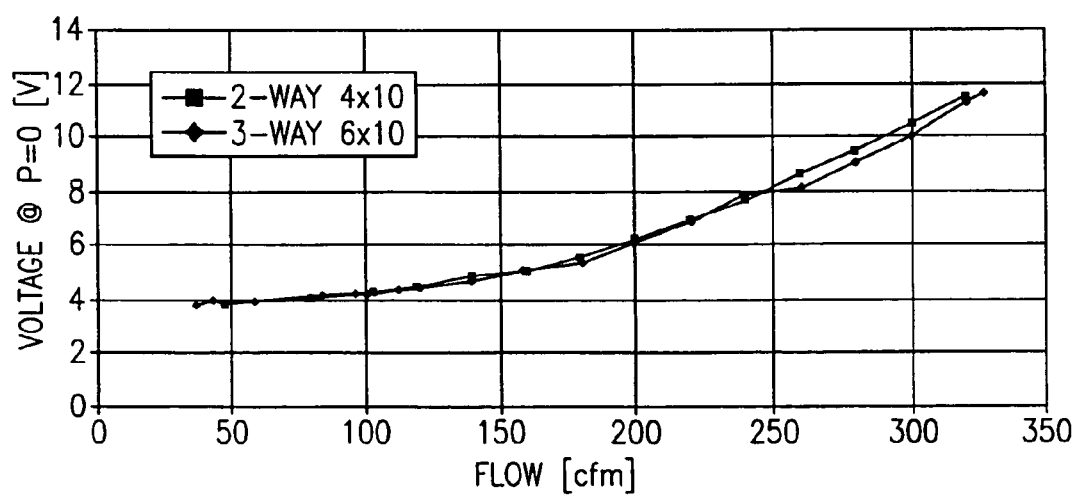
FIG. 6 illustrates a graph relating DC voltage supplied to the external energy source to airflow for two different types of supply registers.

FIG. 6 illustrates a graph relating airflow to DC voltage (at constant pressure) for two different types of registers. As shown, as the DC voltage increases, the airflow increases. In both cases, the DC voltage to flow ratio is the same.

By employing a fan 32 with an external energy source 30 to measure the airflow, the fan 32 does not impede or add resistance to the airflow being measured. Additionally, by employing a flow-straightening element 34 to straighten the airflow, the airflow measurement is not biased by a non-uniform or swirled flow profile. To assure that the fan 32 does not influence the airflow being measured, it is also possible to automatically control the air. The system 20 measures airflow without significant bias and with a high degree of reproducibility without requiring exotic sensors, electronics or other components. The same equipment can be used to measure the airflow and control the pressure. By controlling the energy source so as to make the pressure seen by the grille or register 26 the same as it would be without the fan 32 in place, the fan 32 does not impede nor augment the airflow to or from the grille or register 26.

A control circuit 40 (shown in FIG. 1) can be employed to automatically adjust the voltage or current supplied to the external energy source 30 to maintain the desired zero pressure differential between the capture hood 36 and the room. Alternatively, the pressure differential can be zeroed manually.

The fan 32, a pressure transducer, and control circuitry can be run on AC or DC power. The preferred example uses direct current or batteries.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A device for measuring an airflow comprising:
   a fan; and
   an external energy source to power said fan, wherein one of a voltage and a current supplied to said external energy source indicates a measure of the airflow.

2. The device as recited in claim 1 wherein a pressure proximate to an airflow discharge point or an airflow intake point is substantially equal to a pressure in a room.

3. The device as recited in claim 1 wherein a flow measurement device is used to measure airflow.

4. The device as recited in claim 3 wherein a pressure differential between a room pressure and a pressure proximate to an airflow discharge or an airflow intake is automatically maintained to reduce an impact of said flow measurement device on the airflow.

5. The device as recited in claim 4 wherein said pressure differential across said fan is maintained between 0 and 3.0 Pa.

6. The device as recited in claim 4 further including a control circuit to adjust an energy supplied to said fan to control said pressure differential.

7. The device as recited in claim 1 wherein said external energy source is an electric motor and a battery.

8. The device as recited in claim 1 further including a flow straightening element to straighten the airflow.

9. The device as recited in claim 8 wherein an RPM/flow calibration of said fan is sensitive to a pressure differential across said fan, wherein said flow straightening element maintains said pressure differential across said fan to prevent a change in said RPM/flow calibration of more than 5.0%.

10. The device as recited in claim 9 wherein said pressure differential across said fan is maintained between 0 and 3.0 Pa.

11. The device as recited in claim 9 wherein said flow straightening element is sized to maintain a desired pressure differential across said flow measurement device.

12. The device as recited in claim 8 wherein said flow straightening element is one of a honeycomb, a plurality of straws, and a perforated plate.

13. The device as recited in claim 8 further including a first pressure sensor positioned before said flow straightening element and a second pressure sensor positioned after said flow straightening element, and said first pressure sensor and said second pressure sensor determine said pressure differential across said flow straightening element.

14. The device as recited in claim 1 wherein said fan is a muffin fan.

15. The device as recited in claim 1 wherein said voltage and said current both indicate a measure of the airflow.

16. A method of measuring an airflow comprising the steps of:
    powering a fan with an external energy source; and
    determining a measurement of the airflow based on one of a voltage and a current supplied to the external energy source.

17. The method as recited in claim 16 further including the step of straightening the airflow.

18. The method as recited in claim 16 further comprising the step of maintaining a pressure downstream of an airflow discharge point and said pressure downstream is substantially equal to a pressure in a room.

19. The method as recited in claim 16 wherein the fan is sensitive to a pressure differential across the fan and the step of straightening the airflow maintains the pressure differential across the fan between 0 Pa and 3.0 Pa.

20. The method as recited in claim 16 wherein the step of powering the fan includes using an electric motor and a battery.

* * * * *